No. 885,689. PATENTED APR. 21, 1908.
N. DEL GRANDE.
PYROTECHNIC DEVICE.
APPLICATION FILED JAN. 3, 1907.

WITNESSES:

Nicholas Del Grande,
INVENTOR

By C.A. Snow & Co.
ATTORNEYS

UNITED STATES PATENT OFFICE.

NICHOLAS DEL GRANDE, OF PETERSBURG, VIRGINIA.

PYROTECHNIC DEVICE.

No. 885,689.  Specification of Letters Patent.  Patented April 21, 1908.

Application filed January 3, 1907. Serial No. 350,573.

*To all whom it may concern:*

Be it known that I, NICHOLAS DEL GRANDE, a citizen of the United States, residing at Petersburg, in the county of Dinwiddie and State of Virginia, have invented a new and useful Pyrotechnic Device, of which the following is a specification.

This invention relates to pyrotechnics and more particularly to pyrotechnical devices adapted to be ignited and subsequently thrown in the air manually so as to produce balls of fire of different colors and of great brilliance.

The invention consists of tablets made up in desired sizes and consisting of ingredients which will burn vividly with a predetermined color whenever the tablets are scraped upon a striker of special composition.

In the accompanying drawings has been shown the preferred form of the invention.

Figure 1:
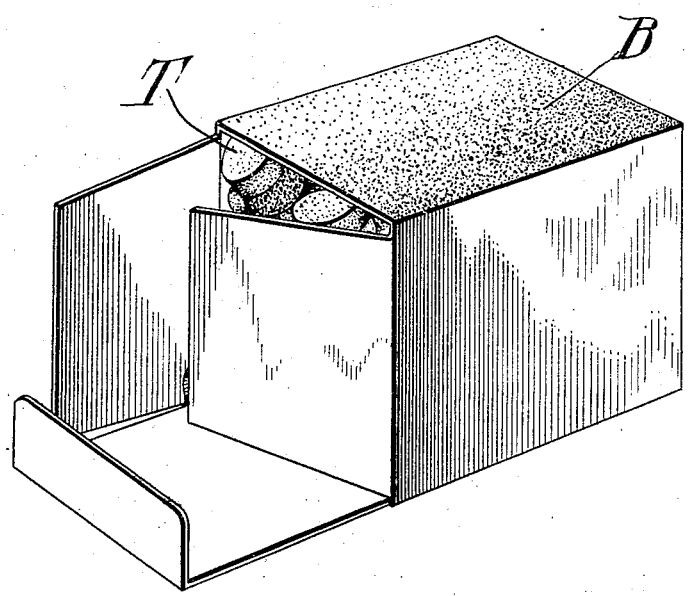
Figure 2:
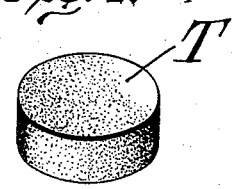

In said drawings: Figure 1 is a perspective view of a box used for packaging the devices; and Fig. 2 is a perspective view of one of said devices.

The composition of the tablets is as follows:

For a green light,
    Chlorate of barium ---- 12 ounces.
    Sugar of milk -------- 2 ounces.
    Gum arabic ---------- 2 ounces.

For a yellow light,
    Chlorate of sodium --- 12 ounces.
    Sugar of milk -------- 2 ounces.
    Gum arabic ---------- 2 ounces.

For a red light,
    Chlorate of strontium 12 ounces.
    Sugar of milk -------- 2 ounces.
    Gum arabic ---------- 2 ounces.

After these various compositions have been produced by mixing the ingredients the same are compressed to form tablets T such as shown in Fig. 2 one tablet being adapted, when ignited, to produce a green light, another a yellow light and a third a red light.

In order to ignite these tablets it is necessary to employ a striker of special composition, the same being made up of the following ingredients in the proportions stated:

Amorphous phosphorus 12 ounces.
    Gum arabic ---------- 6 ounces.
    Plaster of paris ------- 3 ounces.

This composition is spread over one or more surfaces of a box as shown at B in Fig. 1 said box being adapted to contain the tablets although if preferred the striker can be formed of a separate strip of cardboard. In using these tablets they are separately removed and while held in the hand, or in a suitable holder, are drawn over the striker which will result in the ignition of the tablets. The same can then be thrown into the air and will burn vividly to produce one of the three colors mentioned. The tablets are slow burning and therefore ample time is given for throwing them without resulting in the burning of the hand.

It will be noted that in every instance two of the ingredients are similar while the third ingredient of the tablets consists of a chlorate either of an alkali metal or alkaline earth.

What is claimed is:

As a new article of manufacture a pyrotechnic device comprising a holder having one of its outer walls coated with an igniter compound consisting of amorphous phosphorus, gum arabic and plaster of paris, and a plurality of tablets inclosed by the holder and consisting of sugar of milk, gum arabic, and a solid inorganic oxidizing salt that will give a colored flame upon ignition, the igniting of the tablets being effected by striking them upon the igniter surface of the holder.

In testimony that I claim the foregoing as my own, I have hereto affixed my signature in the presence of two witnesses.

NICHOLAS DEL GRANDE.

Witnesses:
    E. HUME TALBERT,
    C. E. DOYLE.